J. SWARTHOUT.
ENGINE ATTACHMENT.
APPLICATION FILED JUNE 29, 1917.

1,296,018.

Patented Mar. 4, 1919.

WITNESSES
W. C. Fielding
Wm. H. Mulligan

INVENTOR
Joseph Swarthout
BY
ATTORNEY

UNITED STATES PATENT OFFICE.

JOSEPH SWARTHOUT, OF LODI, NEW YORK.

ENGINE ATTACHMENT.

1,296,018.   Specification of Letters Patent.   Patented Mar. 4, 1919.

Application filed June 29, 1917. Serial No. 177,773.

*To all whom it may concern:*

Be it known that I, JOSEPH SWARTHOUT, a citizen of the United States, residing at Lodi, in the county of Seneca and State of New York, have invented certain new and useful Improvements in Engine Attachments, of which the following is a specification.

This invention relates to engine attachments and more particularly to an attachment for automobile motors designed particularly to permit power to be transmitted from the motor while the automobile is at a stand still so that machinery in a garage or repair shop may be operated from the power derived from the power of the automobile motor.

Another object of the invention is to provide an attachment of this character that may be easily mounted in place and which may be quickly demounted so that the automobile may be used either as a power station or in its natural capacity.

A further object of this invention is the provision of an engine attachment which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which.

Figure 1:
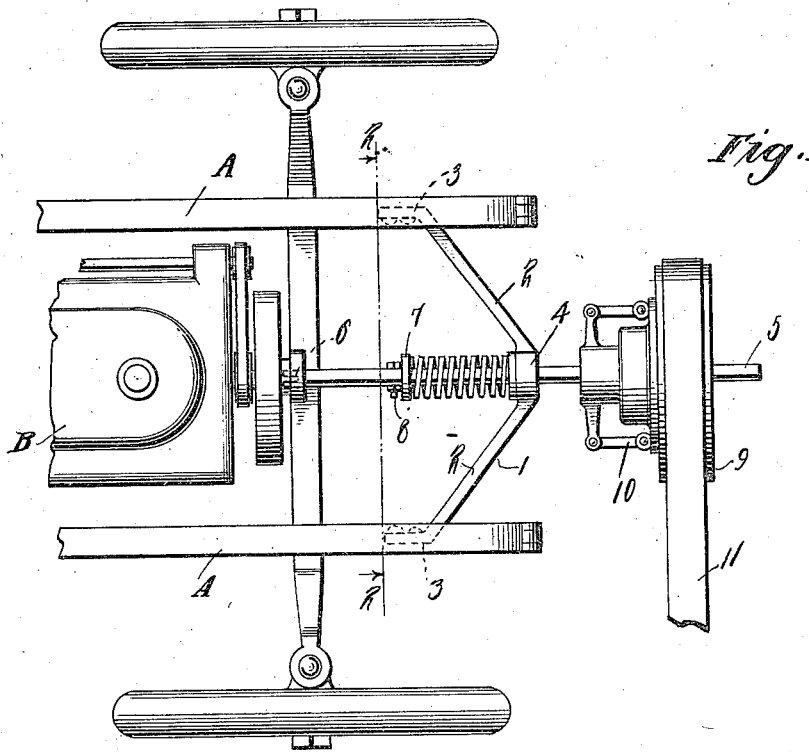
Figure 1 is a plan view of the device showing the same mounted in position on the front of an automobile.
Figure 2:
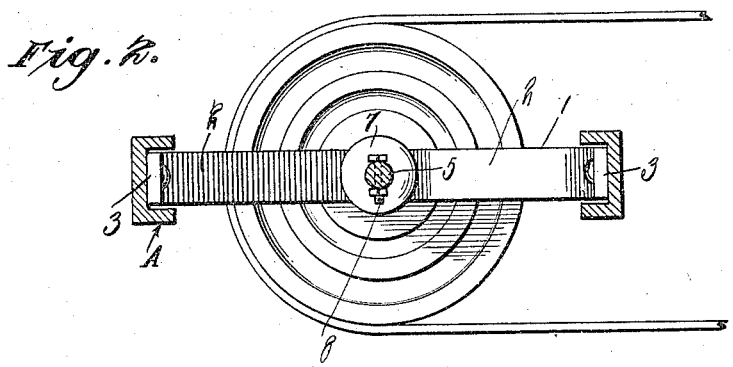
Fig. 2 is a section on the line 2—2 of Fig. 1.

Referring to the drawing, wherein is illustrated the preferred form of my invention, and in which like numerals of reference indicate corresponding parts throughout the several views, a supporting bracket 1 consists of oppositely extending arms 2 the terminals of which are provided with flanges 3 adapted to engage the side bars A of the automobile frame and chassis. These flanges may be secured to the frame as shown or clamped thereto in any preferred manner so that the bracket may be quickly mounted or demounted as desired.

At the center of the bracket is a bearing 4 within which is journaled an auxiliary shaft 5 one end of which is notched as at 6 to fit the notch usually provided in the end of the crank shaft of automobile motors. A collar 7 is mounted upon the shaft and prevented from sliding thereon by a bolt or pin 8 while interposed between the bearing 4 and the collar 7 is an expansion spring. The spring urges the notched end of the shaft into engagement with the crank shaft to prevent disengagement thereof while the shaft is rotating. Apropos of the above it is pointed out that the shaft 5 works as would the ordinary hand crank commonly employed to start automobile motors. By pulling outwardly on the shaft and pressing against the action of the spring the shaft 5 and the crank shaft of the motor may be disconnected.

Mounted upon the shaft, beyond the bearing 4 is a pulley 9 provided with a clutch mechanism 10 of any preferred type and this pulley is adapted to receive a driving belt 11 which may be extended to engage a pulley on the machine to be operated so that power may be transmitted to the latter.

It will be obvious that when the device is mounted into position, it will be merely necessary to start the motor B thus imparting power to the belt through the medium of the pulley and shaft while the operation of the clutch 10 will permit the belt to be stopped or started at will.

From the foregoing it will be observed that a very simple and durable engine attachment has been provided, the details of which embody the preferred form. I desire it to be understood, however, that slight changes in the minor details of construction may be made without departing from the spirit of the invention or the scope of the claim hereunto appended.

I claim:

The combination with an automobile motor mounted upon an automobile frame, the latter including frame bars disposed in a plane horizontal to the motor shaft, of a bracket comprising oppositely extending arms having their terminals fixed to the said frame bars, the center of the bracket carrying a bearing in longitudinal alinement with the said motor shaft, an auxiliary shaft mounted in the bearing and having a notch formed at one end to engage the motor shaft, a collar carried by the auxiliary shaft approximately between the said bearing and the said notched end, and an expansion spring interposed between the said collar and the bearing to normally urge the notch into engagement with the said motor shaft, and a driving element mounted on the said auxiliary shaft, the said bearing being disposed in transverse alinement with the ends of the said frame bars whereby the said driving element is disposed beyond the ends of the same.

In testimony whereof I affix my signature in presence of two witnesses.

JOSEPH SWARTHOUT.

Witnesses:
  LEWIS T. ESSOM,
  HARRY WARD.

Copies of this patent may be obtained for five cents each, by addressing the "Commissioner of Patents, Washington, D. C."